O. S. STURTEVANT.
REGISTER.
APPLICATION FILED JAN. 15, 1908.

902,022.

Patented Oct. 27, 1908.

Inventor
Orange S. Sturtevant

Witnesses

By
Attorneys

UNITED STATES PATENT OFFICE.

ORANGE S. STURTEVANT, OF ADRIAN, MICHIGAN, ASSIGNOR TO ADRIAN WIRE FENCE CO. OF ADRIAN, MICHIGAN.

REGISTER.

No. 902,022.

Specification of Letters Patent.

Patented Oct. 27, 1908.

Application filed January 15, 1908. Serial No. 410,956.

*To all whom it may concern:*

Be it known that I, ORANGE S. STURTEVANT, citizen of the United States, residing at Adrian, in the county of Lenawee and State of Michigan, have invented certain new and useful Improvements in Registers, of which the following is a specification.

This invention relates to registers, and the device disclosed is intended specially for use as a counter or measurer to indicate the length of wire reeled off or supplied. The invention is, of course, adapted for other uses or purposes.

The invention comprises specially improved means for transferring movements from a primary to a secondary disk, the device being of the disk and pointer type; also means for connecting the operating spindle to the disk and actuating mechanism; also improved means for disconnecting the gearing between the disks, when desired.

The invention is illustrated in the accompanying drawings, in which—

Figure 1:
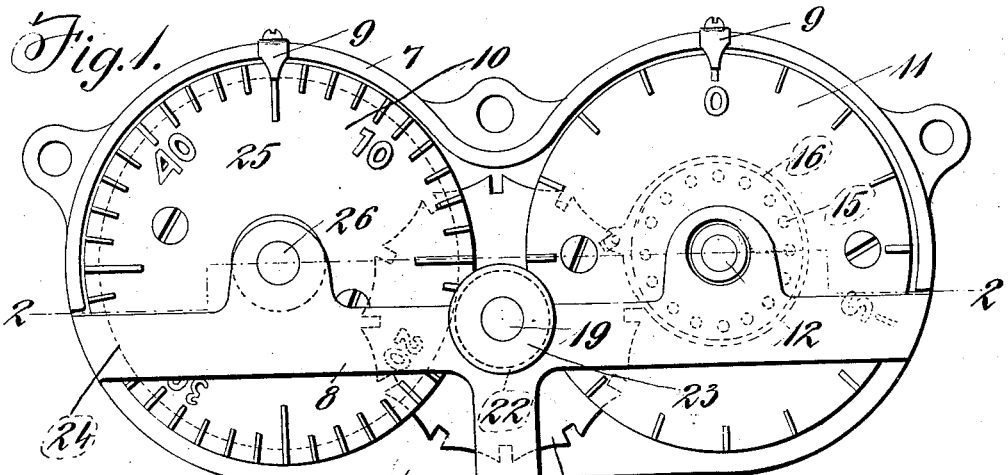
Figure 2:
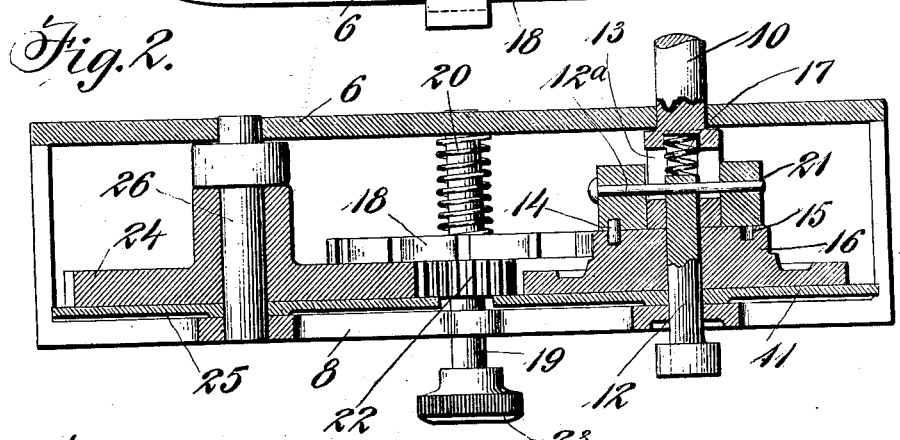
Figure 3:
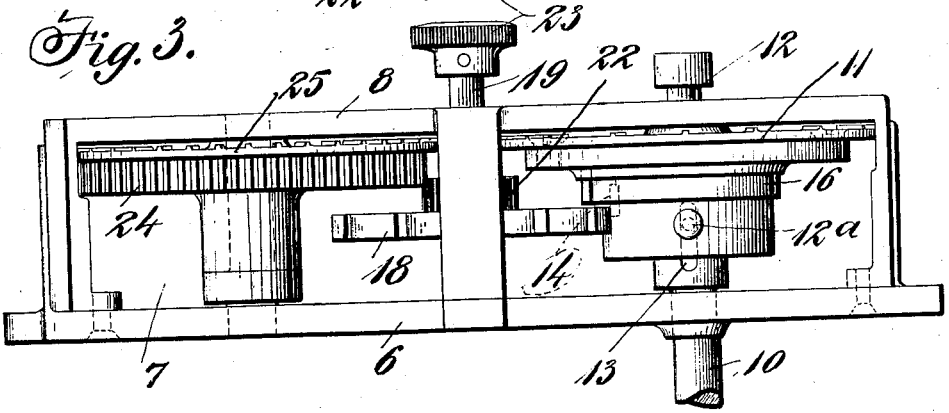

Figure 1 is a face view of the device. Fig. 2 is a section on the line 2—2 of Fig. 1. Fig. 3 is a bottom edge view showing the transfer gear disengaged.

Referring specifically to the drawings, the frame will be seen composed of a back plate 6; top shield or guard 7, and a cross bar 8 at the front, this frame being particularly constructed to support the parts hereinafter described. The pointers 9 for the two disks are fastened to the front edge of the guard.

The primary or operating spindle is indicated at 10, and is mounted in suitable bearing holes in the frame, and carries the primary disk 11 which is loose thereon. This disk may be marked, say, in marks indicating feet. It is connected to or disconnected from the spindle 10 by means of a clutch, which comprises a collar 21 which is slidable lengthwise on the spindle and is operated by means of a push pin 12 at the front. This pin extends into a central bore in the end of the spindle 10 and is connected to the collar by a pin 12ª which projects through slots 13 in the spindle and into suitable holes in the collar. The collar has a projecting clutch pin 14 adapted to engage in any one of a series of holes 15 in the first or pin wheel 16 of a Geneva stop motion. This pin wheel 16 is fastened to or integral with the dial 11, and consequently when the clutch is engaged, the pin wheel and dial will turn with the spindle. The clutch is normally held in engagement by a coiled spring 17 in compression behind the push pin 12.

The secondary or notched wheel 18 of the Geneva stop motion is fixed on a spindle 19 which turns in bearings in the frame, and the spindle is also slidable in and out to engage or disengage the wheels of the stop motion, being normally held in engagement by a coiled spring 20. The spindle also has a pinion 22 fast thereon. At its front end the spindle has a knurled button 23, by means of which it may be pushed in and turned, as shown in Fig. 3, and when pushed in the Geneva wheels are disengaged, but the pinion 22 remains in mesh with the gear 24 of the secondary disk 25. Said gear 24 and disk 25 are fastened together, or may be made in one piece, and are free to rotate upon a spindle 26 extending across the frame. The dial 25 is conveniently marked to represent rods, and the proportion of the gearing is such that it will turn the proper distance at each rotation of the primary disk 11.

In operation, the spindle 10 being rotated, the disks will turn accordingly, and the registering dials will indicate the number of turns, and by extension the length of wire or the like reeled off. To disconnect the registering mechanism and allow the spindle to run free, it is simply necessary to press in the pin 12 which releases the clutch and stops the register. And when the clutch is disengaged, the primary dial 11 may be reset to zero by turning the same by hand. To set the secondary dial 25 to zero the spindle 19 is pushed in and turned. This disengages the wheels of the Geneva motion, but the wide pinion 22 remains in mesh with the wheel 24, as stated, and so the secondary dial may be turned without moving the primary dial.

The device will be found particularly useful in measuring in feet and rods wire reeled off from a machine.

I claim:

1. In a register, the combination of a spindle having a central longitudinal bore in one end, a registering wheel loose on the spindle, a clutch on the spindle and normally engaging the wheel, and a push pin extending into the said bore and connected to the clutch, to disengage the same.

2. In a register, the combination of a frame having an index, a spindle mounted in the frame and having a central longitudinal bore in one end, a dial loose on the spindle, a normally-engaged clutch between the spindle and the dial, and a push pin extending into the said bore and connected to the clutch to disengage the same.

3. In a register, the combination of a primary wheel and a secondary wheel and gearing therebetween, including a spindle and a gear wheel thereon meshing with the primary wheel, and a pinion thereon meshing at all times with the secondary wheel, the spindle being slidable lengthwise to disengage the said gear and primary wheels.

In testimony whereof I affix my signature, in presence of two witnesses.

ORANGE S. STURTEVANT.

Witnesses:
J. N. SAMPSON,
E. H. GRIFFIN.